United States Patent [19]
Denoize et al.

[11] Patent Number: 5,677,842
[45] Date of Patent: Oct. 14, 1997

[54] COLLISION AVOIDANCE DEVICE WITH REDUCED ENERGY BALANCE FOR AIRCRAFT, NOTABLY FOR AVOIDING COLLISIONS WITH THE GROUND

[75] Inventors: Xavier Denoize; Francois Faivre, both of Saint Medard; Thierry Servat, Bordeaux, all of France

[73] Assignee: Sextant Avionique, Meudon la Foret, France

[21] Appl. No.: 468,750

[22] Filed: Jun. 6, 1995

[30] Foreign Application Priority Data

Jun. 14, 1994 [FR] France ................ 94 07247

[51] Int. Cl.⁶ ......................................... G08G 5/04
[52] U.S. Cl. ...................... 364/461; 340/970; 340/977; 364/424.018
[58] Field of Search ............................ 364/433, 443, 364/449, 460, 461, 424.013, 424.017, 424.018; 340/945, 961, 963, 970, 971, 977

[56] References Cited

U.S. PATENT DOCUMENTS

| | | | |
|---|---|---|---|
| 4,916,448 | 4/1990 | Thor | 340/970 |
| 4,924,401 | 5/1990 | Bice et al. | 364/433 |
| 5,111,400 | 5/1992 | Yoder | 364/461 X |
| 5,136,512 | 8/1992 | Le Borne | 364/461 |
| 5,442,556 | 8/1995 | Boyes et al. | 364/433 |
| 5,488,563 | 1/1996 | Chazelle et al. | 364/461 |

FOREIGN PATENT DOCUMENTS

| | | |
|---|---|---|
| 0 565 399 A1 | 10/1993 | European Pat. Off. . |
| 0 597 760 A1 | 5/1994 | European Pat. Off. . |
| WO 85/03566 | 8/1985 | WIPO . |
| WO 92/21077 | 11/1992 | WIPO . |

*Primary Examiner*—Collin W. Park
*Attorney, Agent, or Firm*—Oblon, Spivak, McClelland, Maier & Neustadt, P.C.

[57] ABSTRACT

Disclosed is a collision avoidance device with reduced energy balance for aircraft, in particular for avoiding collision with the ground. This device comprises means for the geographical localization of the aircraft, a database containing a description of safety altitudes, means for the construction of an air floor about the vertical passing through the aircraft, the altitude of the floor being greater than or equal to the safety altitudes about this vertical, means for predicting the air position of the aircraft, means to compare this position with the air floor, means for the computation of avoidance paths and means to determine the energy balance of each of the computed paths. Application to equipment for aircraft, notably for civilian airliners.

9 Claims, 4 Drawing Sheets

COLLISION AVOIDANCE DEVICE WITH REDUCED ENERGY BALANCE FOR AIRCRAFT, NOTABLY FOR AVOIDING COLLISIONS WITH THE GROUND

BACKGROUND OF THE DESCRIPTION

The present invention relates to a collision avoidance device with reduced energy balance for aircraft, notably a device for avoiding collisions with the ground. It can be applied notably to civilian airliners. More generally, it can be applied to all aircraft that, in the course of their mission, have to come excessively close to the ground, for example when they are in the vicinity of mountains, or that have to maneuver in sectors of air space where they constitute a danger or are themselves in danger, for example in prohibited access areas, the avoidance being done without any great consumption of energy.

Devices for avoiding collision between the ground and aircraft are known. These devices are characterized chiefly by the use of radio-altimeters, computers that give the barometric height on the basis of pressure and temperature measurements and navigation means such as an inertial guidance system or a flight management system. The principle of these devices lies in making use of an altimetric height, taken with respect to the ground, and in making use of the variations of the radio-altimetric height or barometric height. The latter is used in particular because of its greater availability for great heights as compared with the variation in altimetric height. These distances from the ground are compared with threshold values that themselves depend on the values of heights and the configuration of the aircraft, depending on whether its undercarriage, flaps or slats are deployed for example. When the parameters measured the heights and the variations of heights as a function of time in particular, exceed the threshold values, an alarm is sent to the crew. However, such devices have the drawback of giving measurements that are excessively delayed with respect to the maneuvering of the aircraft, and hence of generating alarms that are often excessively delayed and prevent the crews from reacting in time. Such devices are therefore likely not to prevent collision. This may happen in particular when the relief takes a sudden upward turn, for example when the aircraft moves towards the side of a sharply rising mountain. Another drawback of the known devices is that they generate unwarranted alarms which are also called false alarms. These may occur for example when the aircraft are flying over low-altitude mountains with a good safety height but when rising features of the relief for example, while being harmless, cause false alarms. These drawbacks seriously reduce the credibility of these collision-preventing devices.

Improvements have been made to these devices, for example by introducing databases that enable the modulation of the value of the thresholds to be taken into account as a function of the geographical position of the aircraft. These improvements are likely to reduce the false alarms. However, they require databases adapted to each type of terrain. As an extension of this latter approach, it is possible to envisage the preparation of a digital field model that would provide for permanent knowledge, depending on its position, of the nature of the relief ahead of an aircraft. Nevertheless, the use of such a model would require a database describing the relief in a sufficiently precise way, hence a database that requires large-sized memories. In addition to this drawback, there is the need for procedures of exchange and for updating a database of this type. This complicates its use. The large number of information elements stored furthermore entails non-negligible risks of error that are detrimental to the reliability of the system.

Another drawback of known avoidance devices is the large power consumption that they necessitate for the correction of the paths, notably when there is a sudden ascent in a path.

SUMMARY OF THE INVENTION

The aim of the invention is to overcome the above-mentioned drawbacks, notably by getting rid of the random factors of variations in relief in determining the position of the aircraft no longer with respect to the ground but with respect to known safety altitudes, making it possible to avoid obstacles by taking paths that offer greater safety and an improved energy balance.

To this end, an object of the invention is a collision avoidance device for aircraft, said device comprising at least:

means for the geographical localization of the aircraft;

a database containing a description of safety altitudes as a function at least of geographical places;

means for the construction, by computation, of a floor about the vertical passing through the aircraft as a function of the geographical localization of the aircraft, these means being connected to the means of geographical localization and to the database, the altitude of the floor being greater than or equal to the safety altitudes about the vertical passing through the aircraft;

means for predicting the air position of the aircraft connected to the localizing means;

means to compare the predicted air position of the aircraft with the constructed floor, these means being connected to the prediction means and to the construction means;

means for the computation of avoidance paths, these means computing one or more avoidance paths as a function of the flight capacities of the aircraft when the result given by the comparison means indicates that a predicted air position of the aircraft is below the floor;

means to determine the energy balance of each of the computed paths.

The main advantages of the invention are that it enables predicting the risks of collision and therefore contributes to reducing the reaction time of the crews to these risks, reduces false alarms, improves the reliability of collision-preventing systems and can be adapted to all types of relief, airspace sectors or navigational constraints.

BRIEF DESCRIPTION OF THE DRAWINGS

Other features and advantages of the invention shall appear in the following description, made with reference to the appended drawings of which.

MORE DETAILED DESCRIPTION

Figure 1:
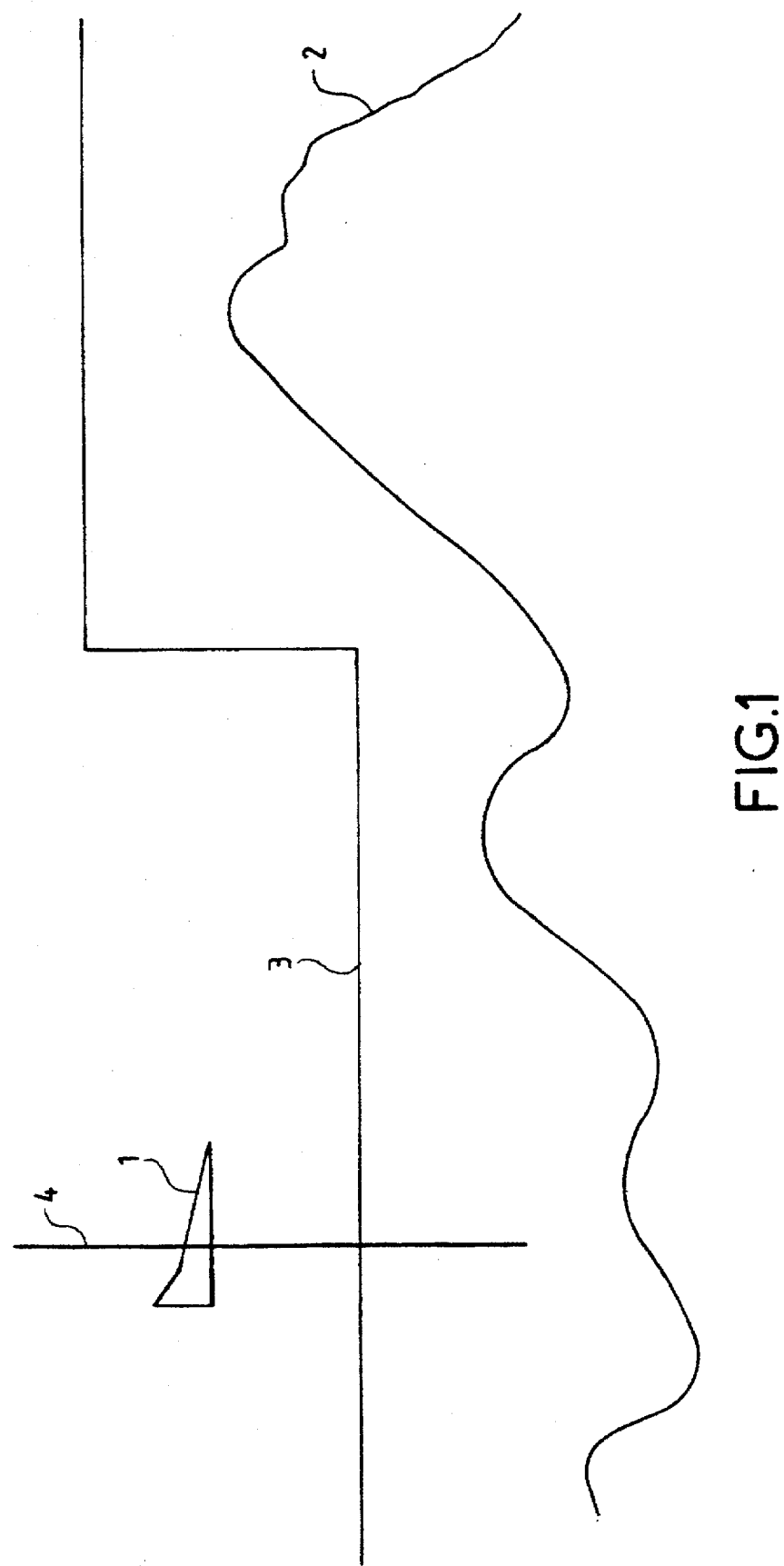
FIG. 1 shows a position of an aircraft 1 with respect to a terrain liable to form an obstacle.

FIG. 1 illustrates a position of an aircraft 1 with respect to a terrain 2 liable to form an obstacle. According to the invention, a description of the safety altitudes of the aircraft 1 is memorized. These altitudes are, for example, defined with respect to the relief of the terrain 2, with respect to prohibited airspace zones or with respect to flying or landing procedures. Depending on the physical localization of the aircraft and depending on the description of the safety altitudes, an air floor 3 is build around the vertical 4 passing through the aircraft, the floor actually constituting an air limit for the aircraft below which a risk of collision is possible. If the geographical localization of the aircraft corresponds to a position of approach towards a landing field, the description of the safety altitudes leads to a type of floor that takes account, in particular, of the landing procedures. If this localization is in a mountainous region, the relief is taken into account. The floor 3 does not closely follow the uneven features of the terrain 2 but is defined, for example, by an overall altitude. This overall altitude is however defined locally. In the event of a rise in the terrain 2, the floor 3 becomes defined by a new overall altitude that is greater at the culminating point of the relief. In the case of a landing maneuver, this overall altitude is defined successively by the different minimum approach altitudes as well as by the approach corridors for example.

Figure 2:
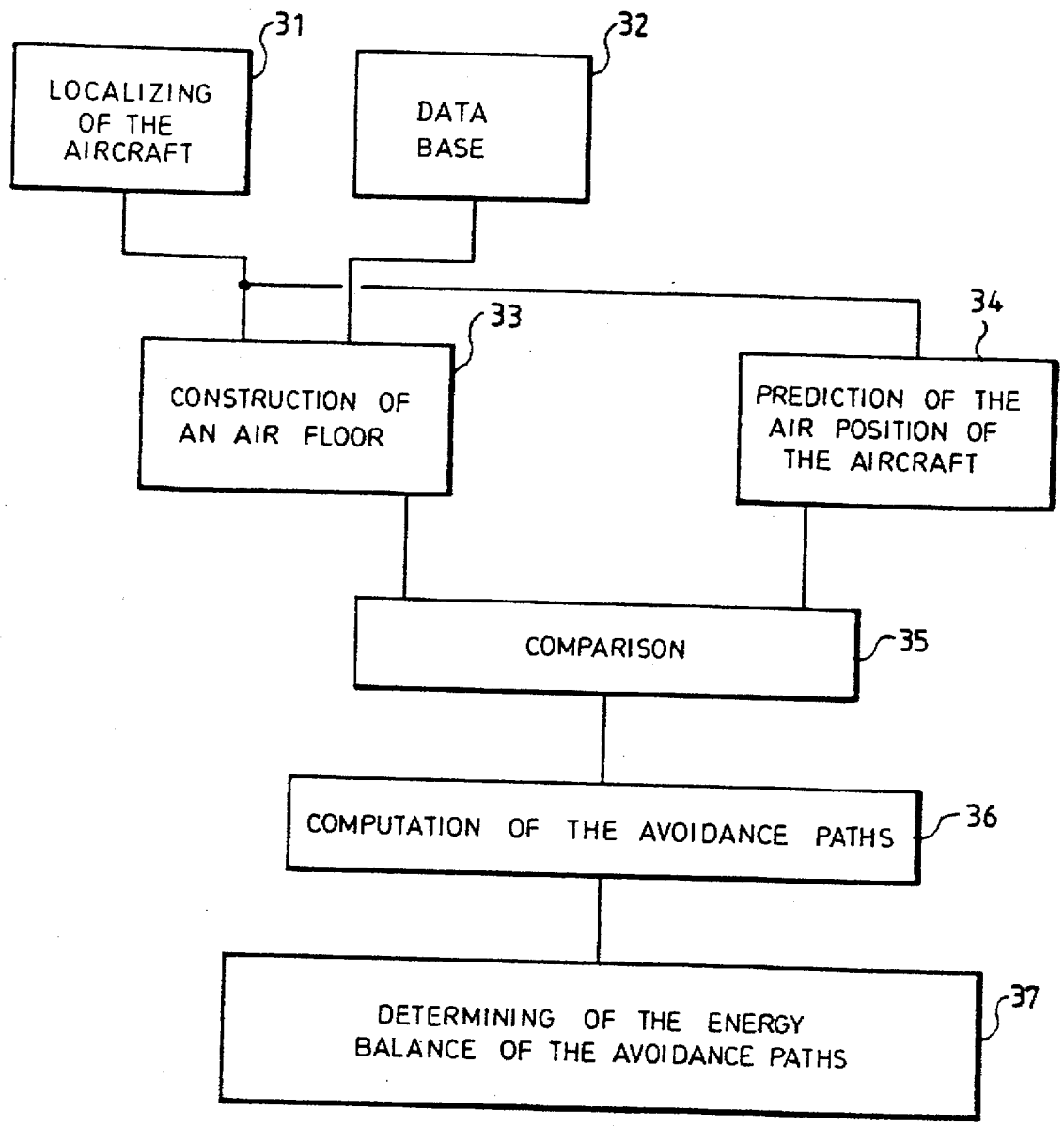
FIG. 2 is a block diagram of a device according to the invention.

FIG. 2 is a block diagram of a device according to the invention. This device comprises at least means 31 for the localization of the aircraft that contains it and a database 32 memorizing notably a description of safety altitudes. Means 33 for the construction, by computation, of an air floor about the vertical passing through the aircraft are connected to the localization means 31 and to the database 32. On the basis of the geographical localization of the aircraft defined by the localization means 31 and of the safety altitudes as a function of the geography of the regions flown over memorized by the database 32, the construction means define an air floor below which there is a risk that the aircraft might collide with the ground or below which the aircraft is no longer in safety. This air floor is, for example, of the floor 3 type as shown in FIG. 1. The floor 3 is, for example, computed throughout the flight of the aircraft.

Means to predict the air position of the aircraft 34 are connected to the localization means 31. These prediction means 34 assess the air position of the aircraft between a first given instant to, which is for example that of the construction of the air floor 3 above the aircraft and a second given instant to+DELTAt. Between each floor construction, several predictions of positions of the aircraft may, for example, be made. One prediction is made notably on the basis of the known position of the aircraft, namely its geographical localization and vertical position at the first given instant, and its speed vector at this instant.

Comparison means 35 are connected to the construction means 33 and to the prediction means 34. These comparison means 35 compare the predicted position of the aircraft with the air floor prepared at the first instant to. If the predicted position of the aircraft is above the air floor, it is deemed to be in safety.

If not, a risk of collision is possible.

Means 36 for computing avoidance paths then make it possible to determine several possible paths for the aircraft 1. These paths depend in particular on the mechanical flight capacities of the aircraft.

Means 37 for determining the energy balance of the collision avoidance path notably enable the aircraft 1 to avoid an obstacle by choosing the avoidance path that consumes the least energy.

The energy balance of each of the paths computed is for example a function of parameters such as a change in altitude of the path, or again its radius or radii of curvature with, in particular, the energy consumed by the aircraft as a function of these parameters being known. These data elements are characteristic of the carrier aircraft.

Figure 3:
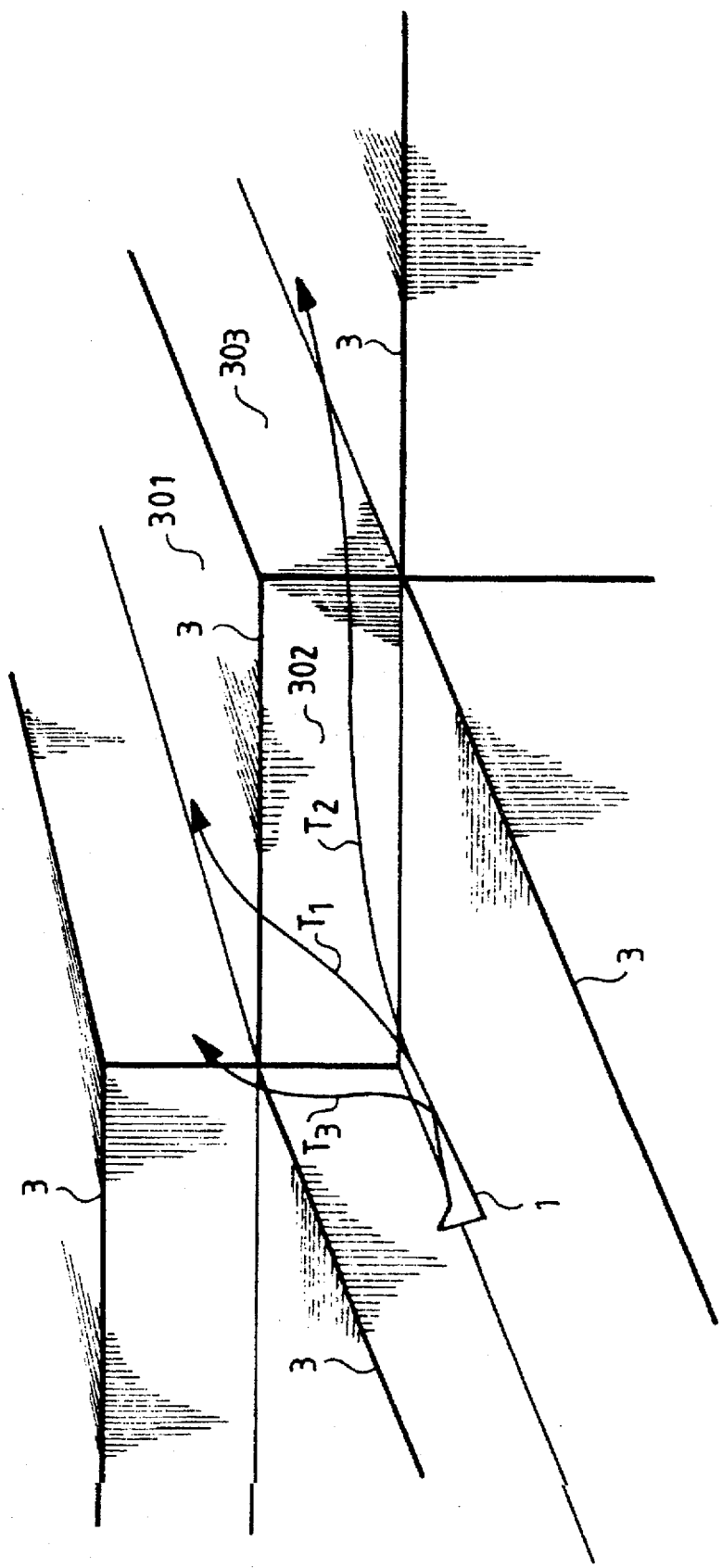
FIG. 3 exemplifies collision paths computed by the device according to the invention.

FIGS. 3 illustrates an example where three avoidance paths T1, T2, T3 have been defined by the computation means 36 in particular as a function of a safety floor 3 with several levels, in the vicinity of the aircraft 1. The computation means 36 set up different avoidance type paths that enable the aircraft to reach a position located above the safety floors with a minimum intersection, if possible a zero intersection, with these floors. For each of these paths, T1, T2, T3, the determining means 37 set up the necessary energy balance in taking proper account particularly of all the maneuvers to be performed. Only the paths compatible with the energy possibilities of the aircraft are taken into account. The means 37 for determining the energy balance of the collision avoidance paths may, for example, transmit data elements to display means or acoustic means to prepare a visual or sound message that can be used to perform the maneuver that is optimal in terms of the energy balance. In one embodiment, all that is transmitted is the indication of the avoidance path entailing the least energy. In another embodiment, several paths may be proposed to the pilot with an indication of the energy balance of each path.

In the example of FIG. 3, the means for predicting the position of the aircraft 1 provide him with a prediction of the passage below a level 301 of the safety floor 3. Three collision avoidance paths T1, T2, T3 are proposed by the means 36 for computing the collision avoidance paths. Two paths T1, T3 avoid the obstacle in passing above the level 301 of the floor 3. One path T2 does not go above this level but turns laterally around the vertical planes 302, 303 that demarcate it, thereby turning laterally around the obstacle that has generated the level 301 of the safety floor 3. From a viewpoint of the energy balance, this last-named avoidance path T2 may be preferred to the others because it consumes less energy than the previous ones which require an ascent by the aircraft 1. Parameters other than a rise in altitude may condition the energy balance, notably parameters relating to the changing of the path of the aircraft: for example, a sudden change in path would consume more energy than a change with a small radius of curvature. It follows therefrom that the energy balance of the different avoidance paths computed following the appearance of an obstacle depend on several parameters related notably to these relative positions of the aircraft and of the obstacle as well as to the speed vector of the aircraft.

Figure 4:
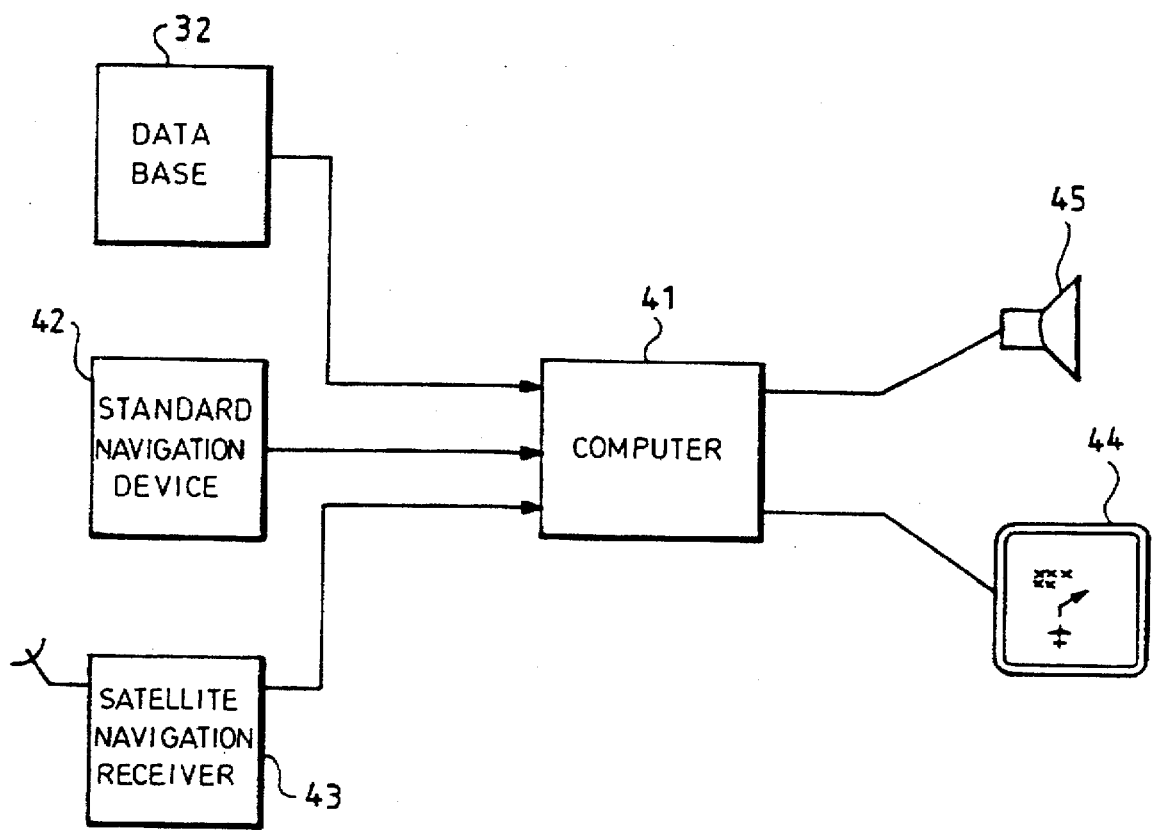
FIG. 4 shows an exemplary possible embodiment of a device according to the invention.

FIG. 4 shows a possible embodiment of a device according to the invention. A computer 41 comprises, for example, the means 33 for constructing an air floor, the means 34 for predicting the air position of the aircraft, comparison means 35, the means 36 for computing avoidance paths and the means 37 for determining the energy balance of the avoidance paths. This computer 41 is connected to the database 32. The latter notably contains all the information elements used to define the floors pertaining to the flight of the aircraft, namely a description of the safety altitudes to be maintained, in particular as a function of the relief features flown over, prohibited air zones and flying, landing or take-off procedures. To this effect, it contains, for example, a description of the navigation beacons for each airport as well as their geographical positions, a description of the approach procedures for each airport and a description of the minimum safety heights to be maintained when no airport is in the vicinity or when the aircraft is at cruising speed. The database 32 may contain, for example, a description of all the airports in the world.

The description of the approach procedures is, for example, formed by a number of rectilinear or arc-shaped segments for which there are given the initial point and the final point in terms of absolute position, namely in terms of latitude and longitude, or in terms of relative position with respect to a navigation beacon, as well as the safety heights to be maintained when passing between these two points.

The description of the minimum safety heights may be obtained by taking, for example, a grid pattern corresponding to the lines of the parallels of latitude and meridians of longitude of the earth's surface and by assigning a minimum safety height value to each square.

Another approach to the organization of the database consists in having it memorize all the safety altitudes instead of the above-mentioned descriptions. However, such an organization notably requires more memory space. By contrast, it may have the advantage of reducing the time needed to compute or build the floors.

The aircraft localization means are, for example, constituted by a standard navigation device 42 and a satellite navigation receiver 43, the latter being used in particular to improve the localization.

The prediction of the air position of the aircraft is done by the computer 41 on the basis of the speed vector of the aircraft and its position. If the comparison of the position of the aircraft with the floor 3 shows that this position is below this floor, the computer 41 computes one or more avoidance paths as a function of the capacities of the aircraft. This includes, in particular, its capacity for pulling up and turning. The computation of the avoidance paths takes account particularly of a reaction time and is aimed at preventing the aircraft from passing below the safety floor 3.

When the computer 41 has prepared the energy balance values for each of the paths, it sends, for example, the path requiring the least energy to the display means 4 to obtain a visual alarm or to the sound alarm means 45 to obtain a sound alarm.

Figure 5:
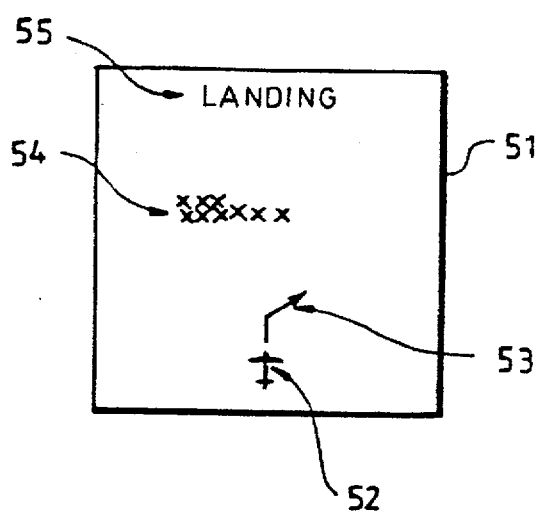
FIG. 5 shows an exemplary embodiment of a visual alarm according to the invention.

FIG. 5 shows an example of a visual alarm according to the invention. This alarm is, for example, made on a screen 51 connected by interface means (not shown) to the computer 41. This screen 51 produces a symbol 52 representing the position of the aircraft 1, an arrow 53 indicating the direction of the path to be followed to avoid the obstacle that is represented, for example, by crosses 54, a message 55 indicating, for example, the nature of the obstacle.

The sound alarm means 45 may, for example, repeat the information elements displayed by the visual alarm means, notably the nature of the obstacle and the direction to be taken to avoid it.

The device according to the invention enables the creation of the avoidance paths that are not obligatorily located in the vertical plane. Now it happens that, firstly, these maneuvers are not necessarily those most suited to the speediest arrival at a secure position with respect to the ground and that, secondly, during the approach to certain airports, this maneuver in the vertical plane may constitute an increased danger of collision with the ground. Devices that predict only vertical maneuvers furthermore comprise a relatively high rate of false alarms during certain take-off or landing approach operations that involve turning in very limited safety volumes, for example for airports located in the vicinity of mountains.

The device according to the invention, by the lateral maneuvers that it computes, enables these drawbacks to be overcome.

The floor 3 defined around the vertical through the aircraft 1 has, for example, a finite number of levels of altitude as can be seen in FIGS. 1 and 3. It is possible to envisage floors with continuously variable altitudes. Such floors in particular enable the device of the invention to be operational practically up to the landing of the aircraft on the ground.

What is claimed is:

1. A collision avoidance path determining device on an aircraft, comprising:

means for locating a position of the aircraft;

a database including safety altitudes corresponding to respective geographical locations;

means for constructing by computation a floor having a floor altitude value being greater than or equal to a respective one of said safety altitudes corresponding to said position of said aircraft, said means for constructing connected to said means for locating and said database;

means for predicting a predicted air position of said aircraft connected to said means for locating;

means for comparing the predicted air position of said aircraft with respect to said floor and for producing a comparison result, said means for comparing connected to said means for predicting and said means for constructing;

means for computing at least two avoidance paths considering a flight capacity, which includes a pulling-up and turning ability, of said aircraft when said comparison result indicates that a predicted air position of the aircraft is below said floor; and means for determining an energy balance for respective of said at least two avoidance paths which consider said flight capacity of said aircraft.

2. The device of claim 1, further comprising a visual alarm means for producing a visual alarm in response to receiving a selected avoidance path, wherein said means for determining comprises means for determining the selected avoidance path by determining which of said at least two avoidance paths has a lowest associated energy balance and for providing said visual alarm means with said selected avoidance path.

3. The device of claim 2, wherein said visual alarm means comprises a screen on which a symbol representing the position of the aircraft and an arrow indicating a direction of the selected avoidance path is displayed.

4. The device of claim 3, wherein said screen is configured to display an obstacle that is avoided by said selected avoidance path.

5. The device of claim 3, wherein said screen is configured to display a text message indicating a nature of an obstacle that is avoided by said selected avoidance path.

6. The device of claim 1, further comprising a sound alarm means for producing a sound alarm in response to receiving a selected avoidance path, wherein said means for determining comprises means for determining the selected avoidance path by determining which of said at least two avoidance paths has a lowest associated energy balance and for providing said sound alarm means with said selected avoidance path.

7. The device of claim 1, wherein said means for locating comprise a standard navigation device associated with a satellite navigation receiver.

8. The device of claim 1, wherein said means for constructing, means for predicting, means for comparing, means for computing, and means for determining are implemented in a computer.

9. The device of claim 1, wherein said means for constructing is for computing said floor by computation throughout a flight of said aircraft.

* * * * *